2,720,932

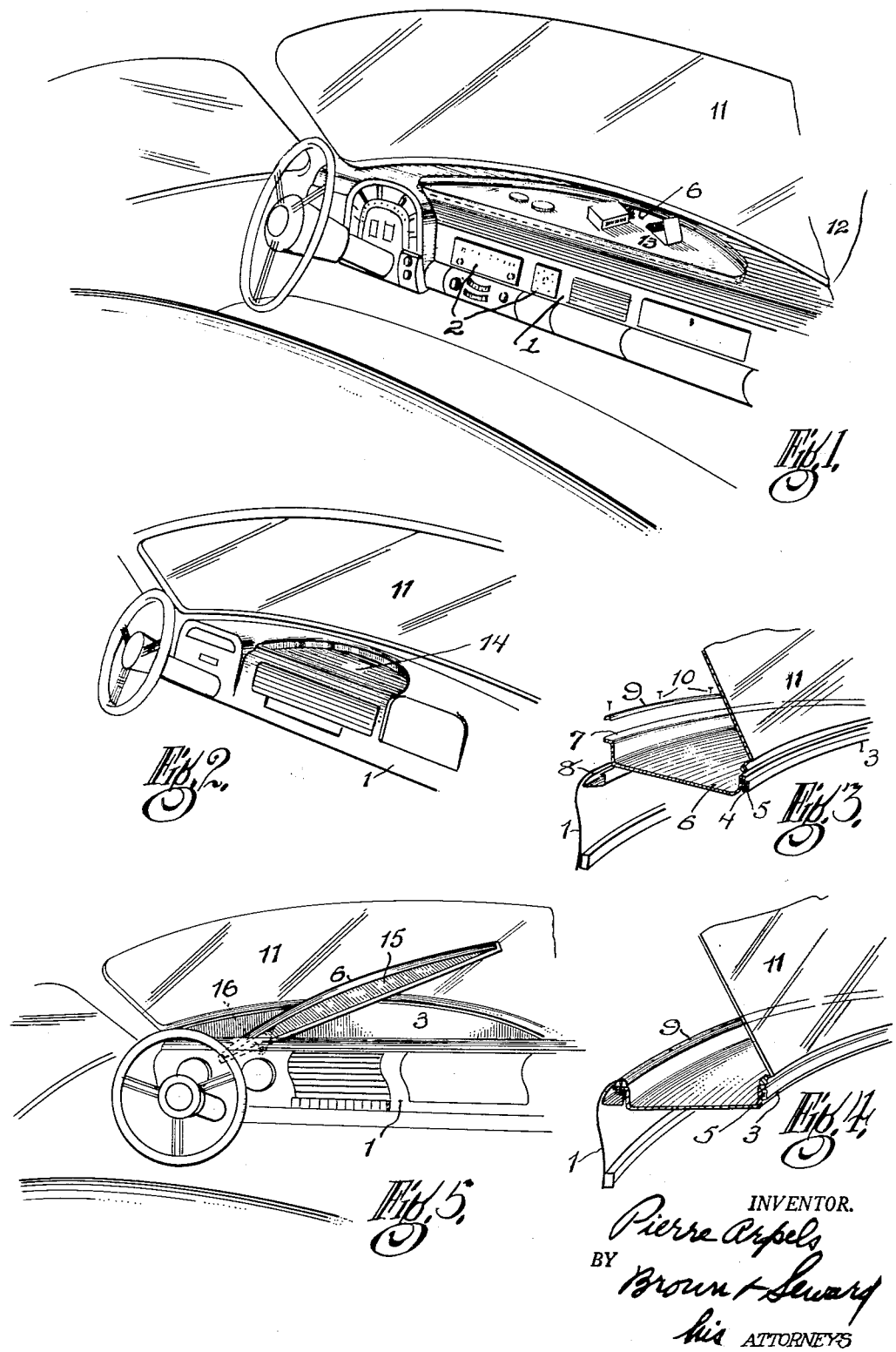

INSTRUMENT PANEL COVER CONSTRUCTION FOR MOTOR VEHICLES

Pierre Raoul Arpels, Paris, France

Application April 23, 1953, Serial No. 350,675

Claims priority, application France March 19, 1953

4 Claims. (Cl. 180—90)

This invention relates particularly to the structure of an element comprising the top of the instrument panel which element is so shaped and located that its upper surface will act as a repository, said element being normally removable.

One object of my invention is to produce a structure of the character described in which a predetermined section of the cover portion is of such configuration that access may easily be had to the rear of the instrument panel by raising the cover.

Another object of my invention is to provide a structure of this type which is susceptible to several modifications so that the top for the instrument panel may be formed in various ways without departing from the spirit and scope of my invention.

A further object is to provide a cover for this type of instrument panel which is adapted to be secured in a place by a construction which will prevent same from rattling or otherwise becoming loose.

Heretofore, in the structures directed to construction in this area of an automobile or other vehicle there has been merely a flat surface or horizontal cavity providing a shelf for the reception of any articles desired. There are also magnetic attachments or boxes which secure themselves or are secured by vacuum or other well known or approved means. The advantage of my device lies in the fact that it is incorporated in the structure itself and thereafter requires no attachment but is always ready for service.

Broadly my invention comprises an instrument panel cover provided with at least one depressed area of predetermined scope and configuration which is adapted to afford access to the rear of the panel from a point inside the windshield.

Practical embodiments of my invention are shown in the accompanying drawing in which:

Fig. 1 represents a top perspective of one embodiment of my invention.

Fig. 2 represents a top perspective of another embodiment of my invention.

Fig. 3 is a transverse vertical section on Fig. 1.

Fig. 4 is a section similar to Fig. 3, the cover being in position to be fastened to the top edge of the instrument panel, and Fig. 5 represents a perspective of a third embodiment of my invention showing the top partially raised.

In the drawing the panel is denoted by 1 which panel depends from a substantially horizontal surface and carries the usual instruments denoted collectively by 2. The upper section 3 of the dash board is constructed and arranged with a channeled edge 4 into which fits the further edge 5 of the removable top or cover 6, the near edge 7 being secured to the upper edge 8 of panel 1 by a strip 9 and screws 10.

It will be noted that this tray or cover 6 is behind and protected by the usual windshield 11 and thereby provides access to all the instruments at their backs without the necessity of raising the hood 12 as is necessary in structures disclosed by the prior art. It will be noted that the removable cover 6 is provided with an indented or depressed portion, denoted in each of the modifications by 13, 14, and 15 which is thereby adapted to act as a repository for any articles desired to be placed thereon, such as eye glasses, keys, cigarettes, etc.

In the assembly of the device, the cover 6 is so manipulated that its farther edge 5 engages the channeled edge 4 adjacent the windshield supporting portion and the cover 6 is then pressed downwardly so that it contacts the near edge 8 of the panel 1 where it may be fastened in the conventional manner to the upper edge of the dash board by screws 10.

Various modifications in the form of the depressed portions 13, 14, and 15 may be possible as shown but the assembly of all these modifications is similar to that described above with the ecexption of that which is clearly shown in Fig. 5 wherein a pin 16 serves as a pivot on which the cover 6 can be swung, the pin extending from the panel 1 to the windshield support and contacting the bottom of cover 6 to support same.

The removable or swingable top or cover 6 may be snapped into suitable clips (not shown) if it is desired to dispense with the screws and strip.

It will be seen from the above that I have provided a structure which is simple in construction but extremely attractive from the standpoint of design and appearance. Its utility is clearly apparent since it serves itself as a repository for any number of desired articles and at the same time is removable when access is desired to the rear of the instrument panel. It is normally constructed of such dimensions that it is easily accessible and, at the same time, in inclement weather, access can be had from inside the windshield rather than through the hood as previously required in connection with the prior art structures.

Since it is evident that various changes may be made in the construction, form and arrangement of the several parts without departing from the spirit and scope of my invention, I do not intend to be limited to the particular embodiment herein shown and described except as set forth in the appended claims.

What I claim is:

1. In a motor vehicle, the combination with a dash board and an instrument panel depending from a substantially horizontal surface, of a top therefor, said top being provided with a depressed central section greater in both horizontal dimensions than in depth extending over a substantial portion at its upper surface, its upper edges releasably engaging the upper surfaces of said dash board and panel to form a tight joint therewith, being tongued into one and removably fastened to the other the parts being so constructed and arranged that access is permitted behind the instrument panel when the top is removed.

2. In a motor vehicle provided with a front hood, the combination with an instrument panel depending from a substantially horizontal surface of a removable top therefor and a dash board, said top being provided with at least one depressed section of greater length and width than depth in its upper surface adjacent one end thereof, its outer edges contacting the upper surfaces of said dash board and panel to form a tight joint therewith being tongued into one and releasably overlapping the other, the parts being so constructed and arranged that access is permitted behind the instrument panel without raising the hood when said top is removed.

3. In a motor vehicle provided with a front hood, the combination with a dash board and an instrument panel depending from a substantially horizontal surface, of a hinged swingable top pivoted near one end, said top being provided with a depressed central section extending over a substantial portion at its upper surface, its upper edges contacting the upper surfaces of said dash board and panel to form a tight joint therewith being releasably and frictionally held thereagainst, the parts being so constructed and arranged that access is permitted behind the instrument panel without raising the hood when the top is raised.

4. In a motor vehicle provided with a front hood the combination with a dash board and an instrument panel depending from a substantially horizontal surface of a removable top therefor, said top being provided with a depressed section extending over substantially its entire upper surface, said upper surface comprising a substantially depressed portion faired into its supporting edges, said edges being snapped into contact with the upper surfaces of said dash board and panel and releasably held thereagainst to form a tight joint therewith, the parts being so constructed and arranged that access is permitted behind the instrument panel without raising the hood when the top is removed.

References Cited in the file of this patent

UNITED STATES PATENTS

| | | |
|---|---|---|
| 2,066,021 | Tjaarda | Dec. 29, 1936 |
| 2,375,567 | Luton | May 8, 1945 |
| 2,636,774 | Lindsay | Apr. 28, 1953 |

FOREIGN PATENTS

| | | |
|---|---|---|
| 378,453 | Great Britain | Aug. 11, 1932 |